United States Patent [19]

Leffert et al.

[11] 4,251,339
[45] Feb. 17, 1981

[54] THERMALLY DRIVEN C(S)+$CO_2$→2CO REACTION WITH HIGH ENERGY NEUTRON SOURCES

[75] Inventors: Charles B. Leffert, Troy; Ralph H. Kummler, Birmingham; Robert A. Piccirelli, Grosse Pointe Shores, all of Mich.

[73] Assignee: Texas Gas Transmission Corporation, Owensboro, Ky.

[21] Appl. No.: 30,715

[22] Filed: Apr. 16, 1979

[51] Int. Cl.³ .............................................. B01J 19/08
[52] U.S. Cl. ............................................ 204/157.1 H
[58] Field of Search ................................. 204/157.1 H

[56] References Cited

U.S. PATENT DOCUMENTS 4,145,269  3/1979  Teitel ........................... 204/157.1 H

OTHER PUBLICATIONS

Copestake et al. "Radiation Induced Reaction of $CO_2$ with Graphite", 3rd Conf. on Industrial C, London (1971).

Anderson et al., *Radiation Research Review* 1, 269 (1968).

*Primary Examiner*—Howard S. Williams
*Attorney, Agent, or Firm*—Laurence R. Brown

[57] ABSTRACT

A process is described wherein solid carbon particles C(S) of various forms are suspended in a carbon dioxide gas ($CO_2$) and exposed to a flux of neutrons from a fusion neutron source for the purpose of converting the very high kinetic energy of the neutrons to chemically stored energy using the endothermic reaction C(S)+$CO_2$→2CO. In contrast to previous art involving the direct radiolytic dissociation of the $CO_2$ molecule, the means described in this invention are aimed at thermally driving the reaction C(S)+$CO_2$→2CO such that a very much higher yield of CO is obtained.

9 Claims, 3 Drawing Figures

THERMALLY DRIVEN C(S)+CO$_2$→2CO REACTION WITH HIGH ENERGY NEUTRON SOURCES

TECHNICAL FIELD

This invention relates to the production of synthesized gaseous fuels and more particularly it relates to production of CO by radiolysis from high energy neutron radiation such as obtained in fusion reactions.

BACKGROUND ART

The fusion of deutrium and tritium releases much of the reaction energy in the form of highly energetic 14.1 MeV neutrons. Considerable effort has been spent in the past few years in a search for means to *capture* this neutron kinetic energy and *convert* it efficiently to chemical binding energy and in particular to a substitute natural gas. Past studies indicate that for pure gas phase radiolysis (such as CO$_2$) both the "capture" and the "conversion" are difficult and present low output yields of CO in the order of G(CO)<10.

Representative prior art of this type developed by the assignee of this invention is as follows:

U.S. Ser. No. 725,339 filed Sept. 21, 1976 (continuation-in-part of U.S. Ser. No. 548,231 filed Feb. 10, 1975) for Pyrochemical Processes for the Decomposition of Water;

U.S. Ser. No. 718,026 filed Aug. 26, 1978 (continuation of U.S. Ser. No. 414,367 filed Nov. 9, 1973, now abandoned) for Production of Hydrogen Based Gaseous Fuel;

U.S. Ser. No. 667,610 filed Mar. 16, 1976 (continuation-in-part of U.S. Ser. No. 416,998 filed Nov. 19, 1973, now abandoned), now U.S. Pat. No. 4,140,601, for Multi-Step Chemical and Radiation Process;

U.S. Ser. No. 675,137 filed Apr. 8, 1976 (continuation of U.S. Ser. No. 478,877 filed June 7, 1974), now U.S. Pat. No. 4,132,727, for Method and Apparatus for the Manufacture of Methanol; and U.S. Ser. No. 609,834 filed Sept. 2, 1975, now U.S. Pat. No. 4,144,150, for Means and Method for Processing Chemicals with Radiation.

The radiolysis of C(S)+CO$_2$ is not new. The United Kingdom Atomic Energy Authority has been concerned for many years about graphite rod gasification under radiation conditions, Dominey, D., H. Morley, and R. Waite, The Radiolytic Reaction between Graphite and CO$_2$, AERE Report R. 4987 (1967).

This considered the radiolytic reaction between graphite and CO$_2$ and found that the reaction C+CO$_2$ goes at temperatures as low as 400° K. in the presence of radiation. Without radiation, the normal temperatures necessary to achieve reaction are well in excess of 900° K., Copestake, T. and N. Corney, "Radiation induced Reaction of CO$_2$ with Graphite," 3rd Conf. on Indust. C, London (1971).

This study of the radiation-induced reaction of CO$_2$ with graphite found that there was a significant increase in the reaction rate for very small particle sizes and for low CO$_2$ pressures. Their highest observed G value, however, was only 2.6. Anderson and Dominey in *Radiation Research Reviews* 1, 269 (1968), report a maximum in graphite pores of 4.6 with half believed to be derived from the gaseous CO$_2$. At that time, Anderson and Dominey believed that the energy was absorbed by the CO$_2$ gas, leading to chemically active species which attacked the graphite, rather than by energy absorption by the graphite itself. In a dissertation performed at the University of Utah in 1974, Che, S., "Microwave Pyrolysis of Coals of Polynuclear Hydrocarbons," Ph.D Dissertation, U-Utah, irradiated coal using microwaves. He finds that microwave pyrolysis of coals is a rapid gasification process. All of the experiments are difficult and quantitative information with respect to the mechanism of the reaction sequence and even the resulting yields as a function of the input energy, are not well understood.

It is clear that the prior art has not resulted in large yields of CO from radiolytic processes from either CO$_2$, C or mixtures thereof, nor has it derived any processes where the expected G(CO) could be radically increased by an order of magnitude.

Neither has there been any specific radiolysis treatment of C(S)+CO by high energy neutrons achieved from fusion reactions to convert the neutron kinetic energy to thermal energy for efficiently thermally driving the C(S)+CO$_2$→2CO process in supplementation of the radiolysis process to produce a higher G(C0) yield to an order of magnitude. The present invention proposed the combined effects of radiolysis, thermal drive at higher, more efficient temperature ranges and scavenging of O$_2$ by C to produce greater G(CO) yields in the order of 100.

DISCLOSURE OF INVENTION

A mixture of solid carbon particles C(S) and gaseous CO$_2$ is treated by radiolysis from high energy neutrons obtained from a fusion reaction to convert the neuron kinetic energy to thermal energy thereby increasing the CO yield. The mixture is preferably isolated in a container surrounding a central fusion energy source thereby to prevent contamination, to simplify separation and to use the output CO in any environment. With the addition of suspended solid carbon particles in the CO$_2$ a qualitatively different conversion scheme is possible. Neutrons are stopped by the solid carbon, and the operating temperature can be elevated to thermally drive the reactions to a very high yield [G(CO)~100]. Thus both the CO$_2$ and the C(S) are thermally converted to CO in the reactions C(S)+CO$_2$→2CO in an environment that also contributes prior known CO$_2$ radiolytic dissociation by presence of the radiation.

The following disclosure summarizes various ideas and design calculations that have been generated to teach, support and document the workability of the proposed process.

BEST MODE FOR CARRYING OUT THE INVENTION

Figure 1:
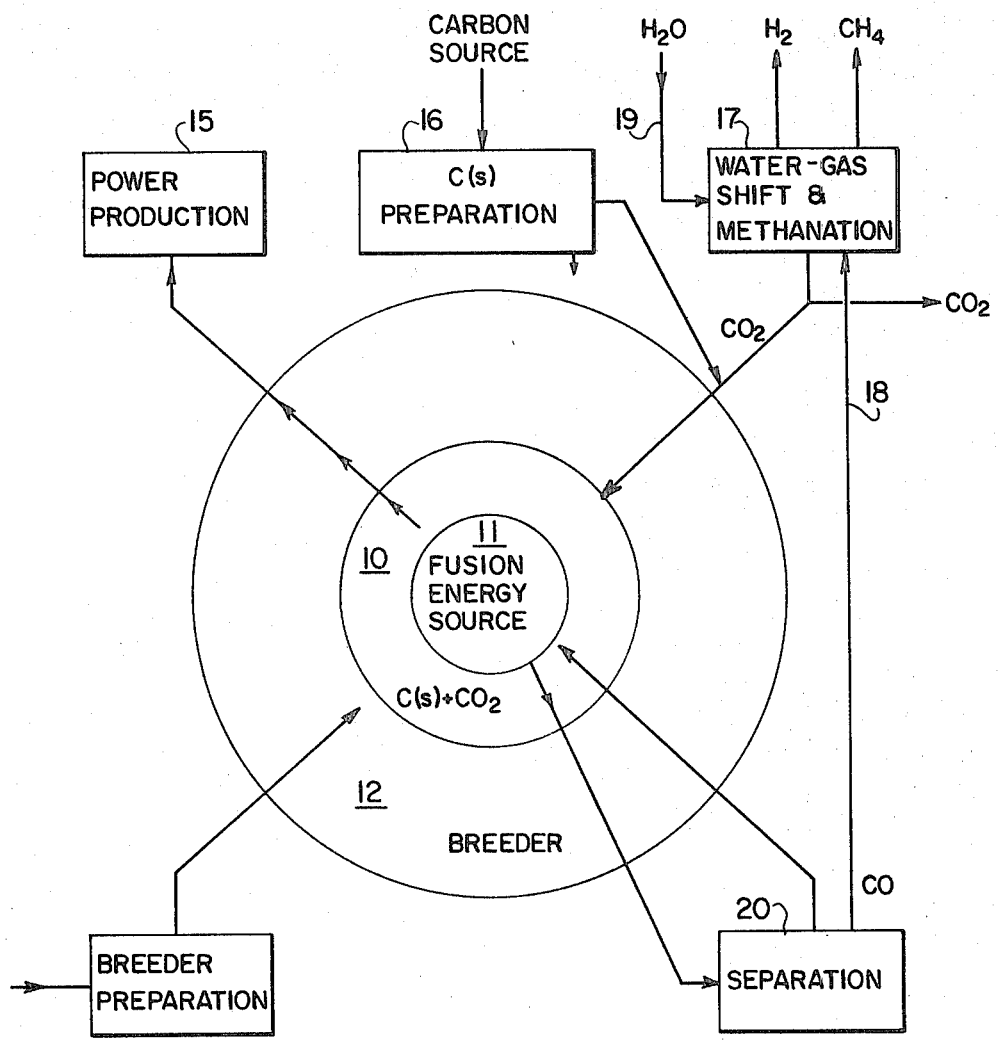
FIG. 1 is a block diagram sketch of a fusion energy system incorporating the invention.

In studies on the direct neutron radiolysis of gaseous chemical compounds to produce synthesized combustible fuels, solid carbon C(S) was introduced into the target gas to scavenge oxygen atoms into CO and thus prevent the back reaction from reducing the product.

Also using both C(S) and $CO_2$ in $H_2O$ was considered to scavenge oxygen atoms from dissociation of both $H_2O$ and $CO_2$. However, this presented the costly problem of separating hydrogen from tritium. This invention isolates the $C(S)+CO_2 \rightarrow 2CO$ reaction because capturing the neutron energy in the central chamber of a fusion reactor also involves separation of deuterium and tritium. The $C(S)+CO_2$ target medium is isolated in a secondary chamber surrounding any high energy neutron source. One way to achieve this is to operate the chamber as a fluidized bed of char to give a heavy loading of C(S) to stop the neutrons. An embodiment of this with a laser-fusion neutron source produced a number of calculations using sophisticated kinetics codes to confirm that the various desired reactions could be produced in reasonable reactor volumes at reasonable rates.

The thermally driven $C(S)+CO_2 \rightarrow 2CO$ reaction does indeed produce high yields $G(C) \sim 100$ but it also consumes a considerable amount of solid carbon. To minimize carbon consumption means were provided in the fusion reactor geometry to drive the respective $CO_2 \rightarrow CO + \frac{1}{2}O_2$ and $C(S)+CO_2 \rightarrow 2CO$ reactions in separate chambers but through which the neutrons consecutively passed. Thus, there was achieved a safe, efficient and economical means for producing a gaseous fuel from the energy liberated in a fusion reactor, wherein the fusion energy is converted to the chemical binding energy of the fuel from the high quality state of kinetic energy of the primary fusion product particles. This improves the prior art attempts to degrade the neutron kinetic energy down to heat in some working fluid to use heat exchangers for driving endothermic reactions. The Carnot thermodynamic principle shows that the theoretical potential energy conversion efficiency from heat to work is much higher at the higher effective temperature of the chemical conversion afforded from kinetic energy to thermal energy by use of solid C(S) to intercept high energy fusion neutrons. The work output in this case is the conversion of the neutron kinetic energy to convert it in an endothermic process to chemical binding energy and in particular to produce a substitute for natural gas. At the higher temperatures afforded by the absorption of neutron kinetic energy in solid carbon the work efficiency of this process improves.

Also the neutron kinetic energy is converted without the very serious problem of producing with said kinetic energy of the fast fusion product particles including neutrons into another energy form in a sufficiently short path length to allow a reasonably sized and thus economical fusion reactor, while avoiding contamination of the product fuel with unsafe radioactive species, or products hard to separate from the fuel.

Some of the advantages of this invention to produce a synthesized fuel gas CO include:
(a) The product molecule CO is itself a useful fuel or it can be readily used as a feedstock to produce $H_2$ via the conventional water-gas shift reaction, $CO+H_2O \rightarrow H_2+CO_2$. Carbon monoxide can also be reacted with some of said $H_2$ to synthesize methane, alcohols, gasoline or other chemicals. Also the $CO_2$ from the water-gas shift reaction can be recycled back to the fusion reactor for reconversion.
(b) Solid carbon C(S) is very effective for slowing down fast neutrons to convert their kinetic energy to thermal energy in the very atom needed to react with the $CO_2$.
(c) Solid carbon has a very low cross section for nuclear reactions that produce radioactive products.
(d) The $C(S)+CO_2 \rightarrow 2CO$ reaction process is an open cycle requiring large amounts of carbon. There is much relative cheap carbon available in the crust of the earth as coal, other fossil fuels or inorganic carbon compounds.

A preferred embodiment of this invention is shown in FIG. 1 where the $C(S)+CO_2$ mixture is introduced into the reaction chamber 10 surrounding the central fusion chamber 11. This embodiment also shows an outer chamber 12 which is used for breeding tritium for fusion fuel with the energy-degraded neutrons via nuclear reaction with lithium −6 and further to produce heat for electrical power generation in a conventional way.

As indicated by block 15, the high temperature $C(S)+CO$ mixture can also be processed for thermally exchanging energy for additional power production.

For processing, the carbon particles should be fine and without substantial contamination as shown by block 16 and they may be injected by conventional means into the chamber 10 along with $CO_2$, preferably recycled from a water-gas shift process 17 that produces synthesized $CH_4$, and $H_2$ from CO and $H_2O$ inputs at 18, 19 respectively. Thus CO, $H_2$ and $CH_4$ synthesized fuel gas components are available.

Separation methods for separating CO from $CO_2$ are well known and are thus represented in block form 20. The separation of C(S) from the gaseous $CO_2$ affords no serious problem.

IRRADIATION OF $CO_2$ + C(S)

The long mean free path for energetic 14 MeV fusion neutrons in a purely gaseous medium has made this invention important in reducing reactor size. Addition of solid carbon to $CO_2$ greatly increases the stopping power for these neutrons and further permits the necessary kinetic to thermal energy change so that the neutrons can drive the thermal reaction,

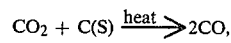

$$CO_2 + C(S) \xrightarrow{heat} 2CO,$$

at a high enough temperature to considerably improve the yield. The potential CO yield is very high: $G(C) \sim 100$.

In this respect there are two primary endothermic reactions involved, namely, $CO_2 \rightleftharpoons CO + \frac{1}{2}O_2$ and $C(S)+CO_2 \rightleftharpoons 2CO$.

By considering these and calculating total energy available as radiation and heat as supplied by the kinetic energy of the fast neutrons the yield of CO can be determined. The total available neutron energy is thus apportioned between the radiation energy absorbed by the first above reaction, the heat absorbed by the second above reaction and the heat of the reaction products exiting at 1200° K. The reaction kinetics involved in this are discussed in more detail in the following paragraphs.

REACTION KINETICS

Since both radiolytic driven dissociation of $CO_2$ and the thermally driven reaction of $C(S)+CO_2$ are considered to be a part of this invention, we gain much information on each and also a comparison of the relative rates as a function of temperature by studying both reactions in an isothermal system of $C(S)+CO_2$ which is being radiated by charged particles at dose rate, D(eV $g^{-1}$ $sec^{-1}$). An energy balance is taken at steady state operation at temperature T matching the total input energy E.

In the radiolytic bombardment of a system such as $C(S)+CO_2$ there are, of course, many elementary reactions involving ionic, excited and neutral species. We have most of these in computer runs. For the others we searched the literature to find the effective reaction rates for C(S) particles. We then selected the most important key reactions to make a mathematical model of the reacting operation system k. These reactions with their reaction rate coefficients A, B and C according to:

$$k = A \left(\frac{300}{T}\right)^B \exp \frac{-1000\,C}{T}$$

are shown in Table 1 for the 16 numbered reactions.

TABLE 1

| | | REACTION RATE COEFFICIENTS | | | | A | B | C |
|---|---|---|---|---|---|---|---|---|
| | .C(S) | .C | .CO | .CO2 | .E− | .O | .O2 .CO4− .CO2+ | .CO2* |
| 1 | .C(S) | + | + | =C | + | + | . 6.72E+10 | 0.00E−00 | 8.40E+01 |
| 2 | .C(S) | +O2 | + | =CO2 | + | + | . 5.79E−11 | 0.00E−00 | 2.22E+01 |
| 3 | .C(S) | +CO2 | + | =CO | +CO | + | . 5.28E−06 | 0.00E−00 | 4.43E+01 |
| 4 | .C(S) | +O | + | =CO | + | + | . 1.91E−14 | 0.00E−00 | 4.28E+00 |
| 5 | O2 | +CO2 | + | =O | +O | +CO2 | . 4.40E−07 | 1.00E+00 | 5.96E+01 |
| 6 | .O | +O | +CO2 | =O2 | +CO2 | + | . 3.00E−33 | 2.90E+00 | 0.00E+00 |
| 7 | .C | +O2 | + | =CO | +O | + | . 1.50E−11 | −5.00E−01 | 1.66E+00 |
| 8 | .CO2 | +CO2 | + | =C | +O | +CO2 | . 5.00E−05 | 1.00E+00 | 6.61E+01 |
| 8 | .CO | +O | +CO2 | =CO2 | +CO2 | + | . 2.76E−32 | 0.00E+00 | 1.76F+00 |
| 10 | .C | +CO2 | + | =CO | +CO | + | . 1.74E−13 | −5.00−01 | 1.80E+00 |
| 11 | .E− | +CO2+ | + | =CO | +O | + | . 3.00E−06 | 0.50E+00 | 0.00E+00 |
| 12 | .E− | +O2 | +CO2 | =CO4− | + | + | . 3.30E−30 | 0.00E+00 | 0.00E+00 |
| 13 | .CO2+ | +CO4− | + | =CO2 | +O2 | +CO2 | . 4.00E−06 | 0.50E+00 | 0.00E+00 |
| 14 | .CO2* | + | + | =CO | +O | + | . 1.00E+09 | 0.00E+00 | 0.00E+00 |
| 15 | .CO2 | + | + | =E− | +CO2+ | + | . 1.14E−04 | 0.00E+00 | 0.00E+00 |
| 16 | .CO2 | + | + | =CO2* | + | + | . 1.82E−04 | 0.00E+00 | 0.00E+00 |

The reaction rate for the various major reactions taking place with the materials involved are set forth in the sixteen different lines of Table 1. By solving simultaneous equations for these sixteen reactions, where the materials present progress from left to right over the various columns, the yield of CO can be determined at a steady state balance. The last two lines (15 and 16) are the driving reactions. The terminology E' is to designate electrons, C is vaporized carbon, $CO_{2+}$ is ionized carbon dioxide, $CO_{2*}$ is electronically excited carbon dioxide, and CO4− is a representative negative ion.

Figure 2:
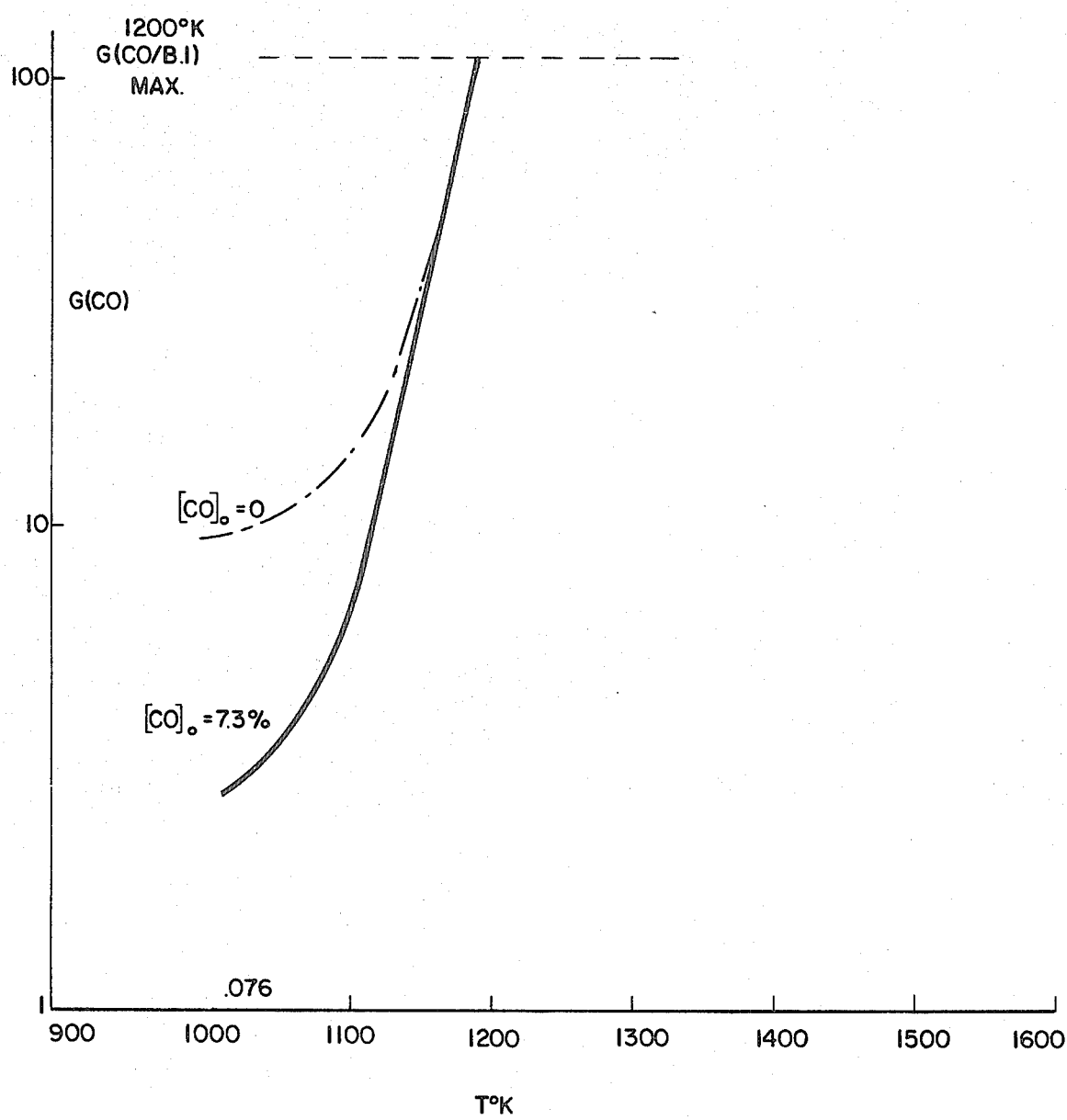
FIG. 2 is a graph of the calculated G(C0) obtained by the radiolysis of the C(S)+CO$_2$ mixture of this invention as a function of temperature.

By programming a computer to calculate the reaction rate, we solved for the yield G(C0, (molecules/100 eV) at various temperatures T at a radiolytic dose rate consistent with an expected commercial sized fusion reactor. The results of these calculations are shown in FIG. 2. Note in particular that the yield G(C0)=10 at T=1000° K. is consistent with previous studies of the reaction with only $CO_2$ present, but then it increases rapidly above T=1000° K. The dashed line at G(C0)=115 through the curve at T=1200° K. represents the maximum yield as set by an energy balance at steady-state (for T<1200° K. the gas is heating and for T>1200° K. the gas is cooling).

Note that the results shown in FIG. 2 with a 7.3% mixture of CO with the $CO_2$ validate the basic claim that this invention gives a much higher yield G(C0) than is possible with radiolysis of a pure gas such as $CO_2$ alone, or even with C(S) but at lower temperatures (for example T≦1000° K.) as obtainable by the exchange of neutron kinetic energy to thermal energy obtained when the C(S) mixture of this invention is provided.

Thus the radiolysis takes place in the computer run both isothermally and in steady state, where the dose rate $D=520\times10^{19}$ eV $g^{-1}$ $sec^{-1}$ for C(S) particle size $d=10^{-3}$ cm, at a pressure p=87.14 atmosphere and temperature T=1200° K.

In FIG. 2, the initial composition of the radiolyzed mixture denoted by the solid line is $CO_2$=91.8%, CO=7.3% and C(S)=0.9% by weight. The dotted line run has 0% CO initially.

Thus, the G(CO) yield is increased by an order of magnitude above that from radiolysis of a pure gas in accordance with the teachings of this invention.

Even greater advantages are realized if a complete system is contemplated in a coal gasification plant which strips hydrocarbons, where the coal by-products are used for the carbon feedstock requirements. Therein the carbon-steam reaction $2\,C(S)+2\,H_2O\rightarrow 2\,H_2+2\,CO$ runs produce hydrogen as well as the water shift reaction of FIG. 1, namely $CO+H_2O\rightarrow CO_2+H_2$ thereby producing a $CO_2$ supply. A third step methanation of CO by the reaction $3\,H_2+CO\rightarrow CH_4+H_2O$ also can be used thereby to achieve the desired output substitute for natural gas.

Figure 3:
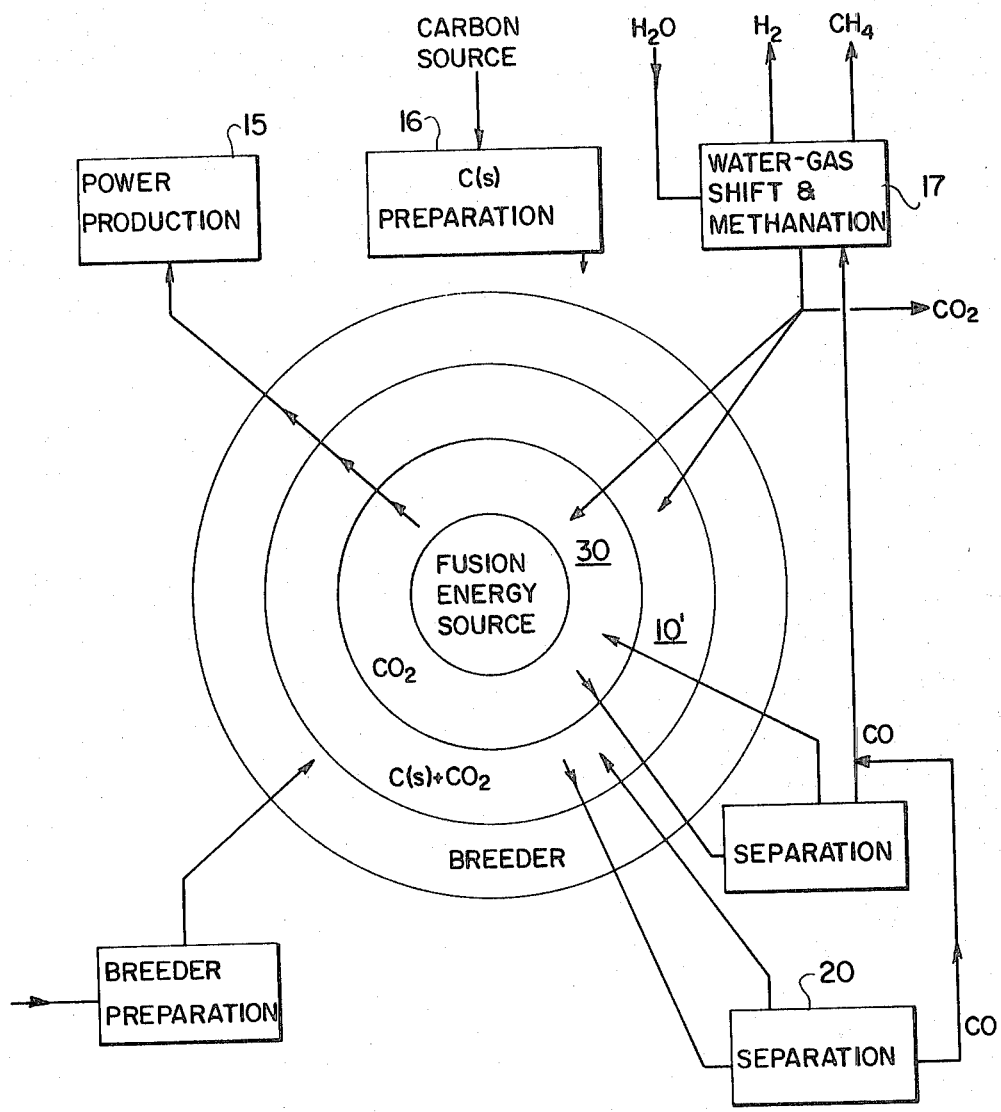
FIG. 3 is an alternate embodiment of the invention providing a better output efficiency of synthesized gas per unit consumption of input C(S).

By use of the combined Thermal-Radiolysis method of this invention the reduction of carbon consumption from 2 moles per mole $CH_4$ to 1 mole can be obtained by the embodiment of FIG. 3, wherein the fusion neutrons are used successively in chambers 30 and 10' for radiolysis of $CO_2$ and the $CO_2+C(S)$ mixture. This compares roughly to a more than 3 moles carbon requirement for conventional gasification and about 2 moles for the single step of radiating only the $CO_2+C(S)$ mixture. The heat for the endothermic reactions is supplied by the fusion neutron energy.

INDUSTRIAL APPLICABILITY

It is a general objective of the present invention to provide a safe, efficient and economical means for producing a gaseous fuel from the energy liberated in a fusion reactor. More specifically, the objective is to provide a means for converting said fusion energy to the chemical binding energy of the fuel while said fusion energy is still in the high quality state of kinetic energy of the primary fusion product particles rather than, as proposed by others, degrade said energy down to heat of some working fluid and then to exchange and drive endothermic reactions. The Carnot thermodynamic principle shows that the potential energy conversion efficiency is much higher at the higher quality (i.e., effective temperature) of the conversion.

It is a further objective of the present invention to arrange said means of converting said fusion kinetic energy to help solve a very serious problem with any fusion reactor which is to convert said kinetic energy of the fast fusion product particles into another energy form in a sufficiently short path length to allow a reasonably sized and thus economical fusion reactor.

Still another objective of the present invention is to provide means for converting said fusion kinetic energy to gaseous fuel energy to protect the product fuel from contamination of unsafe radioactive species.

Still another objective of this invention is to use the mixture of solid carbon C(S) with carbon dioxide gas ($CO_2$) to capture the said fusion neutron energy into the product of carbon monoxide CO. This means is advantageous for a number of reasons. The different process conditions and reactions involved with this invention makes possible new solutions to overall plant problems of fusion reactor size and geometry, component separation and radioactive of the desired product.

We claim:

1. The process of increasing carbon monoxide output in the radiolysis of $CO_2$ with neutron radiation from a fusion reaction energy, comprising the steps of, mixing solid carbon particles and $CO_2$, exposing said mixture to neutron radiation developed by said fusion reaction to convert by neutrons impacting the carbon particles C(S) the neutron kinetic energy to thermal energy reaching in the order of above 1000° K. by reaction with said solid carbon particles thereby thermally driving the reactions $C(S)+O_2 \rightarrow CO_2$ and $C(S)+CO_2 \rightarrow 2CO$ and $2CO_2 + \text{Radiation and Heat} \rightarrow 2CO+O_2$ thereby to produce a yield of CO, G(CO) in the order of 100.

2. The process defined in claim 1 obtained in a fusion reactor with a central chamber including the step of confining the mixture in an exposure chamber surrounding said central fusion chamber.

3. The process defined in claim 2 including the step of excluding hydrogen from said chamber.

4. The process defined in claim 2 including the step of surrounding said chamber with a breeder zone receiving energy degraded neutrons passing through said exposure chamber.

5. The method as defined in claim 1 including the step of preparing C(S) particles in the mixture with a particle size approximating $10^{-3}$ cm and at a composition of the order of 1% $CO_2$ by weight.

6. The method defined in claim 1 including the step of radiating said mixture at a dose rate in the order of $520 \times 10^{19}$ eV $g^{-1}$ sec$^{-1}$.

7. The method defined in claim 1 including the step of confining said mixture in a chamber receiving neutron radiation from an external source at a pressure in the order of between 50 and 100 atmospheres.

8. The method of producing carbon monoxide by radiolysis with neutron radiation including the steps of establishing two successive isolated chambers adjacent to a fusion energy source to receive neutron radiation therefrom successively in the first and second of the two chambers without hydrogen content, confining $CO_2$ in the first said isolated chamber to receive high energy neutrons therethrough for driving the reaction $2CO_2 + \text{Radiation} \rightarrow 2CO + O_2$, and confining a C(S)+$CO_2$ mixture in said second isolated chamber to receive said neutrons passing through the first chamber, and irradiating the mixture by passing the neutrons into the second isolated chamber for driving the reaction C(S)+$CO_2$+Heat and Radiation$\rightarrow 2CO$, where higher temperature is achieved by neutron impact with the C(S).

9. The method defined in claim 8 including the step of passing the neutrons into the second chamber and the step of providing C(S) in the mixture of a denseness absorbing neutrons to develop a temperature in response to the impact with the C(S) in the order of above 1000° K.

* * * * *